United States Patent
Huang et al.

(10) Patent No.: US 10,601,620 B2
(45) Date of Patent: Mar. 24, 2020

(54) DEVICE OF HANDLING BLOCK TRANSMISSION IN MULTICARRIER SYSTEM

(71) Applicants: National Taiwan University, Taipei (TW); MEDIATEK INC., Hsin-Chu (TW)

(72) Inventors: Yen-Ming Huang, Tainan (TW); Bor-Ching Su, New Taipei (TW)

(73) Assignees: National Taiwan University, Taipei (TW); MEDIATEK INC., Hsin-Chu (TW)

( * ) Notice: Subject to any disclaimer, the term of this patent is extended or adjusted under 35 U.S.C. 154(b) by 149 days.

(21) Appl. No.: 15/253,889

(22) Filed: Sep. 1, 2016

(65) Prior Publication Data

US 2017/0070996 A1 Mar. 9, 2017

Related U.S. Application Data

(60) Provisional application No. 62/214,528, filed on Sep. 4, 2015.

(51) Int. Cl.
  *H04L 27/26* (2006.01)
(52) U.S. Cl.
  CPC ............................... *H04L 27/2608* (2013.01)
(58) Field of Classification Search
  CPC ................................................ H04L 27/2608
  See application file for complete search history.

(56) References Cited

U.S. PATENT DOCUMENTS

| | | | | |
|---|---|---|---|---|
| 2008/0112310 | A1* | 5/2008 | Choi | ........................ H04L 1/06 370/210 |
| 2009/0257421 | A1* | 10/2009 | Nakashima | ......... H04L 27/2608 370/345 |
| 2010/0189132 | A1 | 7/2010 | Fettweis | |
| 2010/0254253 | A1* | 10/2010 | Sun | ....................... H04L 5/0019 370/210 |
| 2015/0071242 | A1 | 3/2015 | Vilaipornsawai | |
| 2018/0131549 | A1* | 5/2018 | Berardinelli | ........ H04L 27/2602 |

FOREIGN PATENT DOCUMENTS

| | | | | |
|---|---|---|---|---|
| TW | | 201536008 A | 9/2015 | |
| WO | WO-2016184503 A1 * | | 11/2016 | ......... H04L 27/2602 |

OTHER PUBLICATIONS

Mohammad Al-Amin, Set theory is the ultimate branch of Mathematics, International Journal of Advancements in Research & Technology, vol. 6, Issue 4, Apr. 2017, p. 5 (Year: 2017).*

* cited by examiner

*Primary Examiner* — Afshawn M Towfighi
*Assistant Examiner* — Justin T Van Roie
(74) *Attorney, Agent, or Firm* — Winston Hsu

(57) ABSTRACT

A transmitting device comprises a modulation unit, for modulating a plurality of input signals into a plurality of modulated signals; a transform unit, coupled to the modulation unit, for transforming the plurality of modulated signals into a plurality of transformed signals according to a time-frequency transform; and a transmitting unit, coupled to the transform unit, for transmitting the plurality of transformed signals on a first subset of a plurality of subcarriers in a block transmission.

12 Claims, 7 Drawing Sheets

DEVICE OF HANDLING BLOCK TRANSMISSION IN MULTICARRIER SYSTEM

CROSS REFERENCE TO RELATED APPLICATIONS

This application claims the benefit of U.S. Provisional Application No. 62/214,528 filed on Sep. 4, 2015, which is incorporated herein by reference.

BACKGROUND OF THE INVENTION

1. Field of the Invention

The present invention relates to a device used in a wireless communication system, and more particularly, to a device of handling a block transmission in a multicarrier system.

2. Description of the Prior Art

Enhanced mobile broadband, massive machine type communications, and ultra-reliable and low latency communications are attractive applications to be provided via 5G radio technologies. However, mutual interference arises when the applications are provided via various radio access technologies (RATs) in a same frequency band, such as a long term evolution (LTE) band. The mutual interference may arise due to leakages of spectral sidelobes of the RATs, etc. Performance (e.g., throughput) of the 5G radio technology is decreased if the mutual interference is not mitigated. Accordingly, the benefit of the richness of the applications is diminished.

Thus, the coexistence of the RATs in the same frequency band is an important problem to be solved.

SUMMARY OF THE INVENTION

The present invention therefore provides a device of handling a block transmission in a multicarrier system to solve the abovementioned problem.

A transmitting device comprises a modulation unit, for modulating a plurality of input signals into a plurality of modulated signals; a transform unit, coupled to the modulation unit, for transforming the plurality of modulated signals into a plurality of transformed signals according to a time-frequency transform; and a transmitting unit, coupled to the transform unit, for transmitting the plurality of transformed signals on a first subset of a plurality of subcarriers in a block transmission.

A receiving device comprises a receiving unit, for generating a plurality of received signals on a first subset of a plurality of subcarriers in a block transmission; a transform unit, coupled to the receiving unit, for transforming the plurality of received signals into a plurality of transformed signals according to a time-frequency transform; and a demodulation unit, coupled to the transform unit, for demodulating the plurality of transformed signals into a plurality of output signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
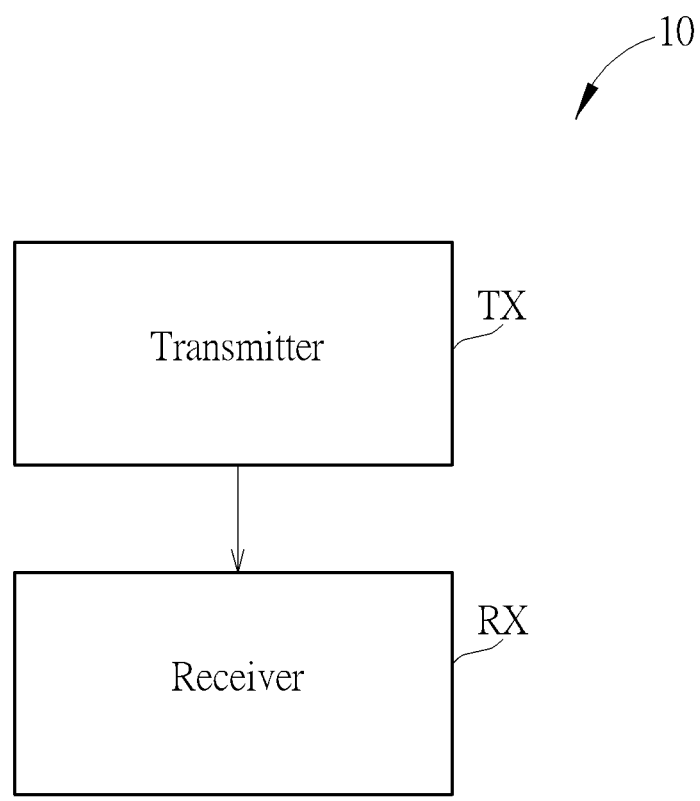
FIG. 1 is a schematic diagram of a communication system according to an example of the present invention.

FIG. 1 is a schematic diagram of a communication system 10 according to an example of the present invention. The communication system 10 may be any (e.g., wireless or wireline) communication system (e.g., multicarrier system) using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are simply utilized for illustrating the structure of the communication system 10. In one example, the communication system 10 may be an asymmetric digital subscriber line (ADSL) system, a power line communication (PLC) system, an Ethernet over coax (EOC) and other wired communication systems. In another example, the communication system 10 may be a wireless local area network (WLAN), a digital video broadcasting (DVB) system, a long term evolution (LTE) system, a LTE-advanced (LTE-A) system, or other wireless communication systems, wherein the DVB system may include a DVB-Terrestrial (DVB-T) system and a DVB-T2 system.

In addition, the transmitter TX and the receiver RX may be seen as a part of a base station and/or a communication device according to direction (i.e., transmission direction). For an uplink (UL), the transmitter TX is installed in the communication device, and the receiver RX is installed in the base station. For a downlink (DL), the transmitter TX is installed in the base station, and the receiver RX is installed in the communication device. In one example, the base station may be an evolved Node-B (eNB) or a relay station in a LTE system, a LTE-A system or an evolution of the LTE-A system. In one example, the communication device may be a user equipment (UE), a low cost device (e.g., machine type communication (MTC) device), a device-to-device (D2D) device, a mobile phone, a laptop, a tablet computer, an electronic book, a portable computer system or combination thereof.

Figure 2:
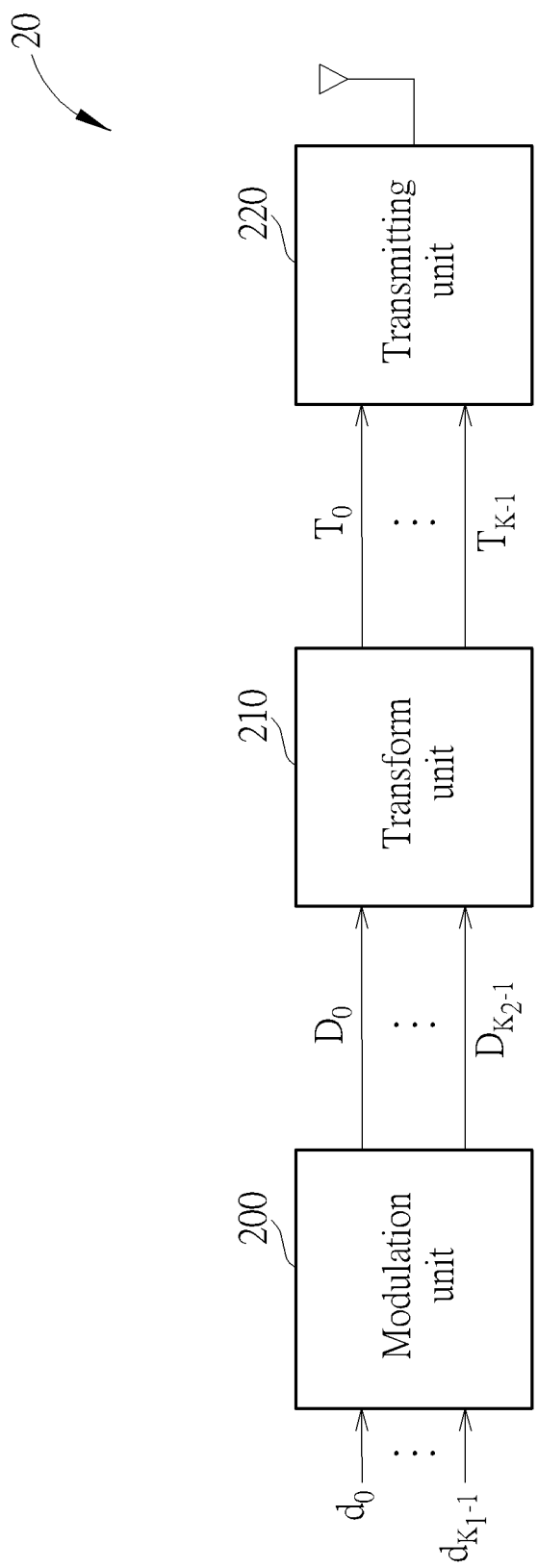
FIG. 2 is a schematic diagram of a transmitting device according to an example of the present invention.

FIG. 2 is a schematic diagram of a transmitting device 20 according to an example of the present invention. The transmitting device 20 may be utilized in the transmitter TX in FIG. 1 for performing a block transmission. The transmitting device 20 includes a modulation unit 200, a transform unit 210, and a transmitting unit 220. In detail, the modulation unit 200 modulates a plurality of input signals $d_n$ ($0 \leq n \leq K_1-1$) into a plurality of modulated signals $D_n$ ($0 \leq n \leq K_2-1$), where $K_1$ and $K_2$ are positive integers. The transform unit 210 is coupled to the modulation unit 200, and transforms the plurality of modulated signals $D_n$ into a plurality of transformed signals $T_n$ ($0 \leq n \leq K-1$) according to a time-frequency transform. The transmitting unit 220 is coupled to the transform unit 210, and transmits the plurality of transformed signals $T_n$ on a first subset of a plurality of subcarriers in a block transmission.

Realization of the transmitting device 20 is not limited, and is illustrated as follows.

In one example, the time-frequency transform may be a discrete Fourier transform (DFT). In one example, the transmitting unit 220 may transmit a plurality of signals on a second subset of the plurality of subcarriers in the block transmission, respectively. That is, the transmitting unit 220 may transmit the plurality of transformed signals $T_n$ and the plurality of signals on different sets of subcarriers in the same block transmission. Preferably, the set of the subcarriers are not overlapped. The first subset of the plurality of subcarriers and/or the second subset of the plurality of subcarriers may include consecutive subcarriers. In one example, the plurality of transformed signals $T_n$ and the plurality of signals may conform to a first communication standard and a second communication standard, respectively. These communication standards may be the same or different (e.g., partly different or completely different), e.g., different radio access technologies (RATs). For example, the plurality of transformed signals $T_n$ may be generated according to 5G technology (i.e., 5G standard), and/or the plurality of signals may be generated according to 4G technology (i.e., 4G standard). In one example, a subcarrier spacing of the plurality of transformed signals $T_n$ and a subcarrier spacing of the plurality of signals may be different (e.g., partly different or completely different). In one example, the first subset of the plurality of subcarriers may be between the second subset of the plurality of subcarriers and a third subset of the plurality of subcarriers. The third subset of the plurality of subcarriers may be reserved for signals generated according to new technologies (e.g., internet of things (IOT), machine to machine (M2M), D2D).

There are various ways for transmitting the plurality of transformed signals $T_n$. For example, the transmitting unit 220 may transmit the plurality of transformed signals $T_n$ according to an orthogonal frequency division multiplexing (OFDM) technology. That is, the transmitting unit 220 may include an OFDM transmitting unit, and the plurality of transformed signals $T_n$ are processed by the OFDM transmitting unit before being transmitted. There are various ways for modulating the plurality of input signals $d_n$. For example, the modulation unit 200 may modulate the plurality of input signals $d_n$ according to a generalized frequency division multiplexing (GFDM) technology.

Figure 3:
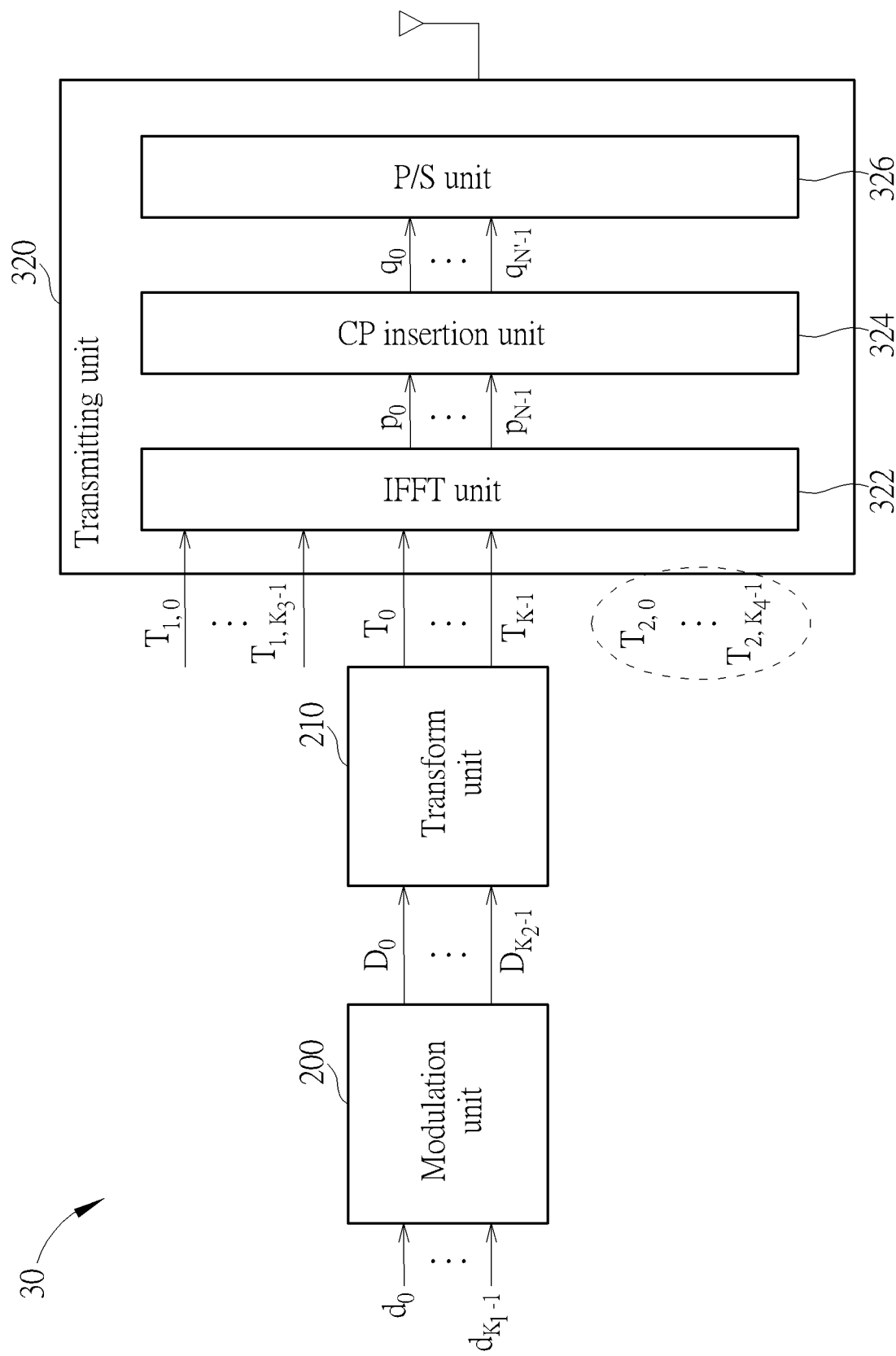
FIG. 3 is a schematic diagram of a transmitting device according to an example of the present invention.

FIG. 3 is a schematic diagram of a transmitting device 30 according to an example of the present invention. As shown in FIG. 3, a transmitting unit 320 is used for realizing the transmitting unit 220. The transmitting unit 320 includes an inverse fast Fourier transform (IFFT) unit 322, a cyclic prefix (CP) insertion unit 324 and a parallel-to-serial (P/S) unit 326. The IFFT unit 322 performs an IFFT on the plurality of transformed signals $T_n$ and a first plurality of signals $T_{1,n}$ ($0 \le n \le K_3-1$) to obtain a first plurality of processed signals $p_n$ ($0 \le n \le N-1$) for a block transmission. A second plurality of signals $T_{2,n}$ ($0 \le n \le K_4-1$) if available may transmitted by another communication device in the same block transmission. $K_3$ and $K_4$ are positive integers and N is a size of the IFFT. That is, the transformed signals are transmitted with other signals which may be generated according to different versions of a same standard or according to different standards in the same block transmission. The plurality of transformed signals $T_n$, the first plurality of signals $T_{1,n}$ and the second plurality of signals $T_{2,n}$ are located in nonoverlapped subsets of subcarriers of the IFFT, respectively. The CP insertion unit 324 performs a CP insertion operation on the first plurality of processed signals $p_n$ according to the OFDM technology, to obtain a second plurality of processed signals $q_n$ ($0 \le n \le N'-1$), wherein N' is a size of the second plurality of processed signals. The CP insertion operation may include adding redundant samples including part of the first plurality of processed signals $p_n$ or including samples of zeros. Then, the second plurality of processed signals $q_n$ are arranged by the P/S unit 326, and are transmitted to a receiver, e.g., the receiver RX.

Orthogonality between the transformed signals and the other signals in the same block transmission is guaranteed by using the modulation unit 200 and the transform unit 210. Thus, interference (e.g., in-band emission (IBE)) caused by the transformed signals (e.g., $T_n$) to the other signals (e.g., $T_{1,n}$ and $T_{2,n}$) can be reduced to a low level (e.g., predetermined level) lower than that caused by signals without being modulated and transformed.

In addition, the operations of the modulation unit 200 and the transform unit 210 may be described by matrices A and W, respectively, wherein the matrix W may be a DFT matrix. When the input signals and the transformed signals are described by vectors d and g, respectively, the vector g can be obtained as follows: g=WAd.

Figure 4:
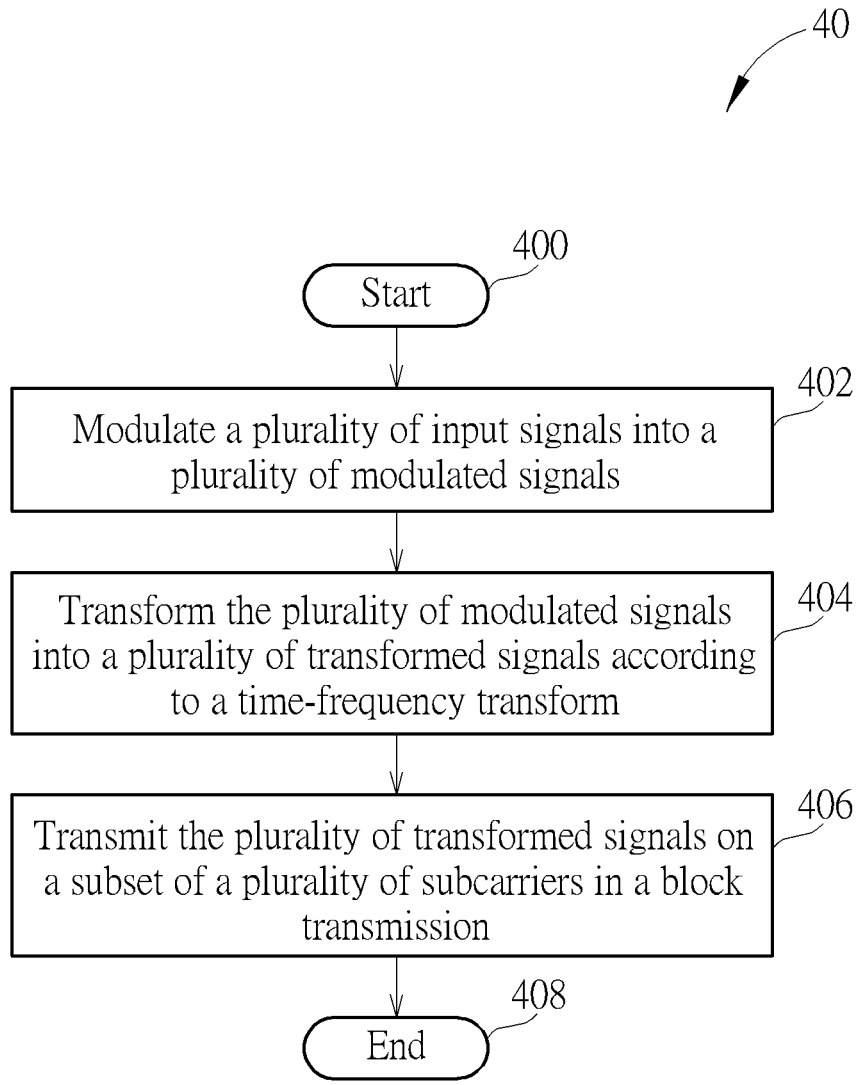
FIG. 4 is a flowchart of a process according to an example of the present invention.

Operations of the transmitting device 20 and/or the transmitting device 30 in the above examples can be summarized into a flowchart of a process 40 shown in FIG. 4, which includes the following steps:

Step 400: Start.

Step 402: Modulate a plurality of input signals into a plurality of modulated signals.

Step 404: Transform the plurality of modulated signals into a plurality of transformed signals according to a time-frequency transform.

Step 406: Transmit the plurality of transformed signals on a subset of a plurality of subcarriers in a block transmission.

Step 408: End.

Detailed operations and variations of the process 40 can be referred to the above illustration, and are not narrated herein.

It should be noted that realizations of the transmitting device 20 (including the modulation unit 200, the transform unit 210, and the transmitting unit 220) and the transmitting device 30 (including the IFFT unit 322, the CP insertion unit 324, and the P/S unit 326) are not limited to the above description. For example, two or more of the abovementioned units may be integrated into one or more units according to design considerations and/or system requirements. In addition, each unit of the transmitting device 20 (or the transmitting device 30) may be hardware (e.g., circuit), software, firmware (known as a combination of a hardware device and computer instructions and data that reside as read-only software on the hardware device), an electronic system, combination thereof, etc.

Figure 5:
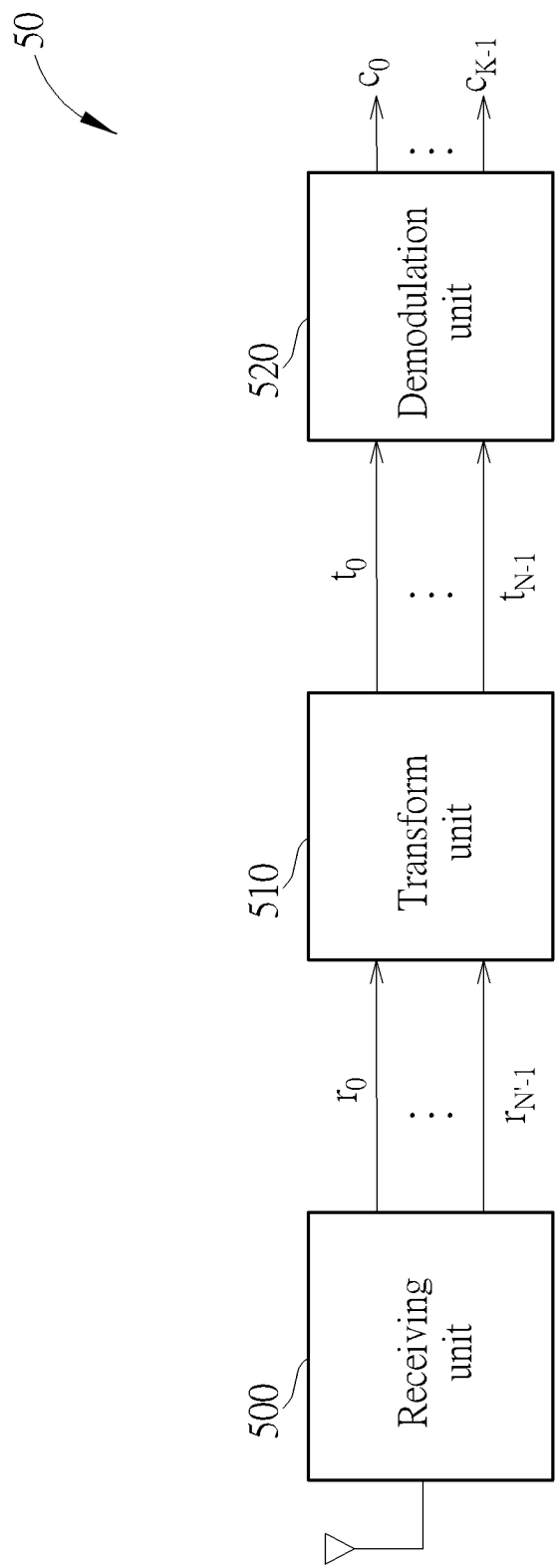
FIG. 5 is a schematic diagram of a receiving device according to an example of the present invention.

FIG. 5 is a schematic diagram of a receiving device 50 according to an example of the present invention. The receiving device 50 may be utilized in the receiver RX in FIG. 1 for receiving a block transmission. The receiving device 50 includes a receiving unit 500, a transform unit 510, and a demodulation unit 520. In detail, the receiving unit 500 generates a plurality of received signals $r_n$ ($0 \le n \le N'-1$) on a first subset of a plurality of subcarriers in a block transmission, e.g., after receiving a plurality of radio signals. The transform unit 510 is coupled to the receiving unit 500, and transforms the plurality of received signals $r_n$ into a plurality of transformed signals $t_n$ ($0 \le n \le N-1$) according to a time-frequency transform. The demodulation unit 520 is coupled to the transform unit 510, and demodulates the plurality of transformed signals $t_n$ into a plurality of output signals $c_n$ ($0 \le n \le K-1$).

Realization of the receiving device 50 is not limited, and is illustrated as follows.

In one example, the time-frequency transform may be an inverse DFT (IDFT). In one example, the receiving unit 500 may generate a plurality of signals on a second subset of the plurality of subcarriers in the block transmission. That is, the receiving unit 500 may generate the plurality of received signals $r_n$ and the plurality of signals on different sets of subcarriers in the same block transmission. Preferably, the set of the subcarriers are not overlapped. The first subset of the plurality of subcarriers and/or the second subset of the plurality of subcarriers may include consecutive subcarriers. In one example, the plurality of received signals $r_n$ and the plurality of signals may conform to a first communication standard and a second communication standard, respectively. These communication standards may be the same or different (e.g., partly different or completely different), e.g., different RATs. For example, the plurality of received signals $r_n$ may be generated according to 5G technology (i.e., 5G standard), and/or the plurality of signals may be generated according to 4G technology (i.e., 4G standard). In one example, a subcarrier spacing of the plurality of received signals $r_n$ and a subcarrier spacing of the plurality of signals may be different (e.g., partly different or completely different). In one example, the first subset of the plurality of subcarriers may be between the second subset of the plurality of subcarriers and a third subset of the plurality of subcarriers. The third subset of the plurality of subcarriers may be reserved for signals generated according to new technologies (e.g., IOT, M2M, D2D).

There are various ways for generating the plurality of received signals $r_n$. For example, the receiving unit 500 may generate the plurality of received signals $r_n$ according to an OFDM technology. That is, the receiving unit 500 may include an OFDM receiving unit, and the plurality of received signals $r_n$ are processed by the OFDM receiving unit before being received. There are various ways for demodulating the plurality of transformed signals $t_n$. For example, the demodulation unit 520 may demodulate the plurality of transformed signals $t_n$ according to a GFDM technology.

Figure 6:
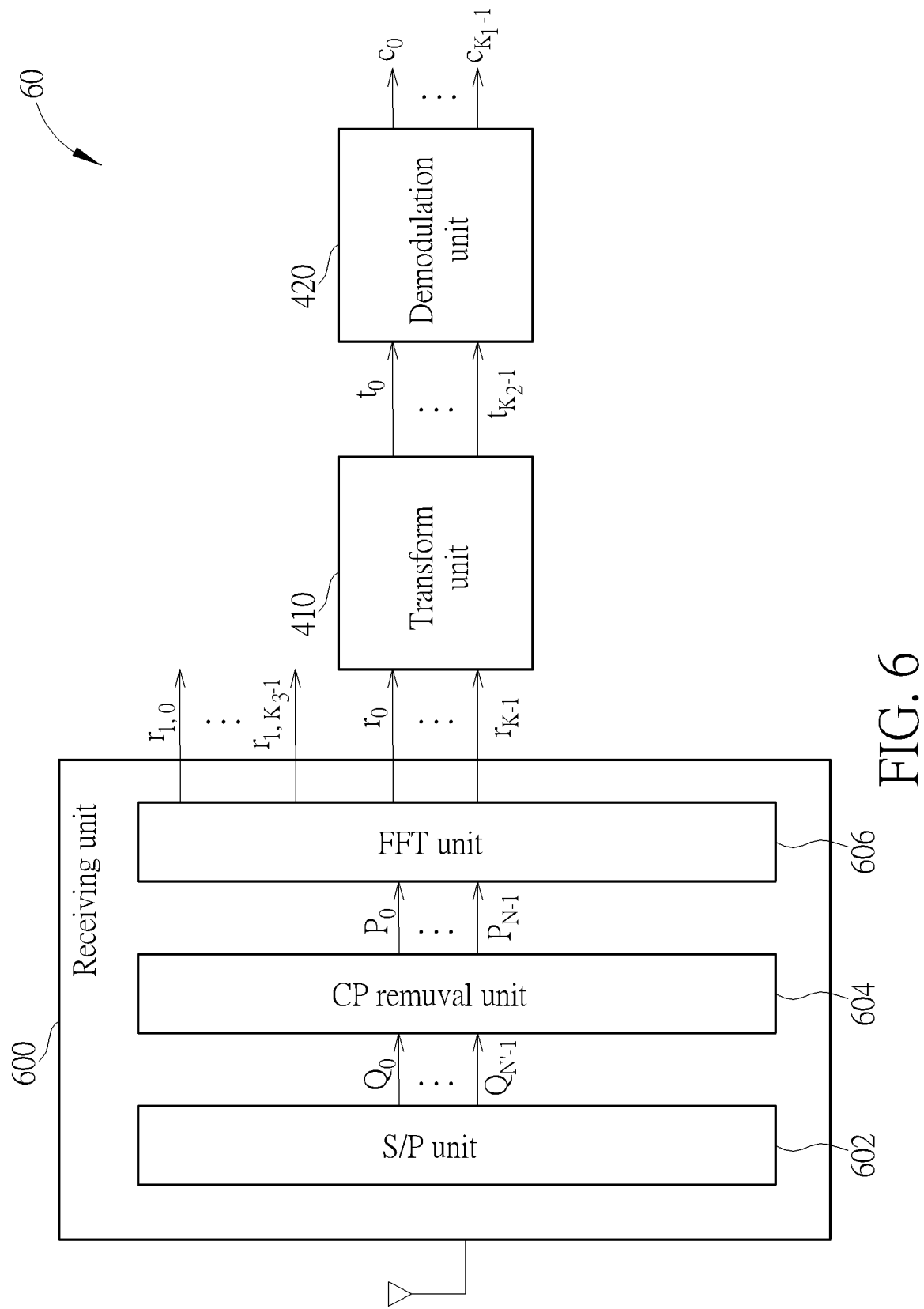
FIG. 6 is a schematic diagram of a receiving device according to an example of the present invention.

FIG. 6 is a schematic diagram of a receiving device 60 according to an example of the present invention. The receiving device 60 may perform operations corresponding to those performed by the transmitting device 30. As shown in FIG. 6, a receiving unit 600 is used for realizing the receiving unit 500. The receiving unit 620 includes a serial-to-parallel (S/P) unit 602, a CP removal unit 604, and a FFT unit 606. After receiving a first plurality of processed signals $Q_n$ (0≤n≤N'−1), the S/P unit 602 arranges and provides the first plurality of processed signals $Q_n$ to the CP removal unit 604, wherein N' is a size of the first plurality of processed signals. The CP removal unit 604 performs a CP removal operation on the first plurality of processed signals $Q_n$ according to the OFDM technology, to obtain a second plurality of processed signals $P_n$ (0≤n≤N−1), wherein N is a size of the FFT. The FFT unit 606 performs a FFT on the second plurality of processed signals $P_n$, to obtain the plurality of received signals $r_n$ and a plurality of signals $r_{1,n}$ (0≤n≤$K_3$−1), wherein $K_3$ is a positive integer. That is, the received signals are received with other signals which may be generated according to different versions of a same standard or according to different standards in a same block transmission. The plurality of received signals $r_n$ and the plurality of signals $r_{1,n}$ are received in nonoverlapped subsets of subcarriers of the FFT, respectively.

Orthogonality between the received signals and the other signals in the same block transmission is guaranteed by using a transform unit and a demodulation unit at a transmitter. Thus, interference (e.g., IBE) caused by the received signals (e.g., $r_n$) to the other signals (e.g., $r_{1,n}$) can be reduced to a low level (e.g., predetermined level) lower than that caused by signals without being modulated and transformed at the transmitter.

In addition, considering the previous equation example, the operations of the transform unit 410 and the demodulation unit 420 may be described by matrices $W^H$ and B, respectively, wherein the matrix $W^H$ may be an IDFT matrix corresponding to the DFT matrix W. When the received signals and the output signals are described by vectors r and u, respectively, the vector u can be obtained as follows: $u=BW^H r$. Let $G=WA$, $BW^H=G^{-1}$ can be obtained if G is invertible, and $BW^H=(G^H G)^{-1} G$ can be obtained if G is not invertible.

Figure 7:
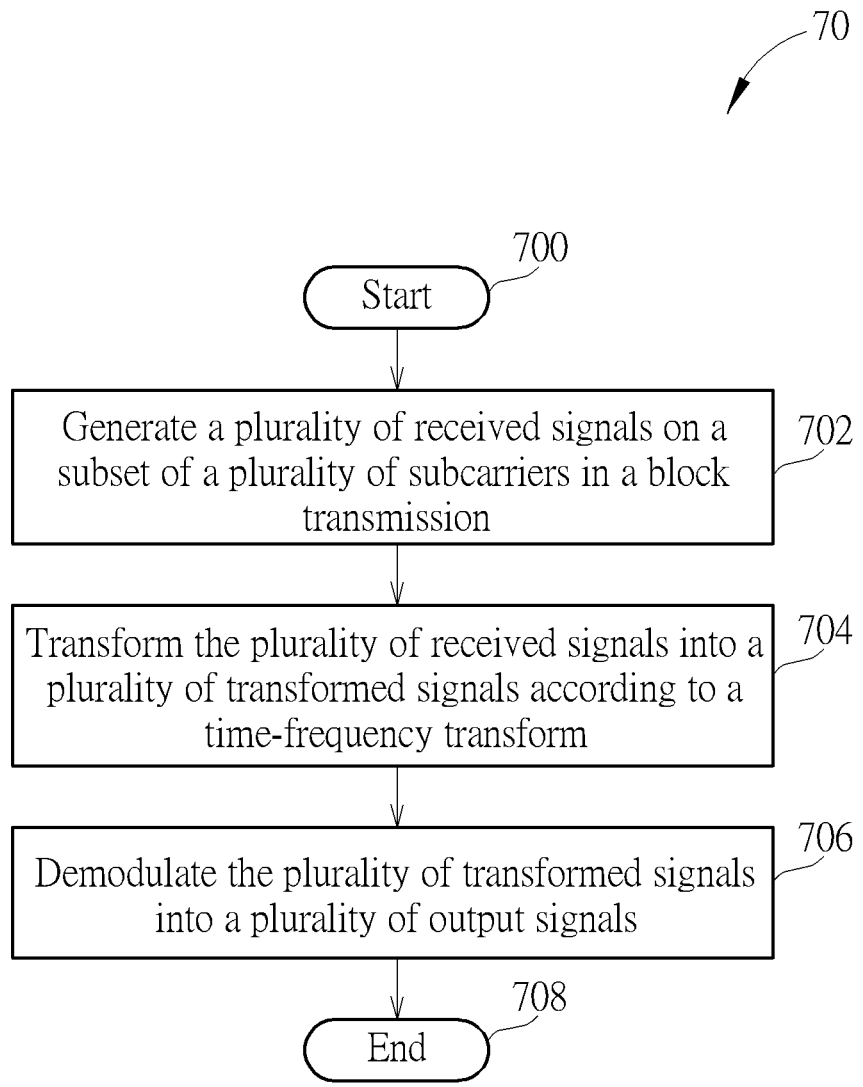
FIG. 7 is a flowchart of a process according to an example of the present invention.

Operations of the receiving device 50 and/or the receiving device 60 in the above examples can be summarized into a flowchart of a process 70 shown in FIG. 7, which includes the following steps:

Step 700: Start.

Step 702: Generate a plurality of received signals on a subset of a plurality of subcarriers in a block transmission.

Step 704: Transform the plurality of received signals into a plurality of transformed signals according to a time-frequency transform.

Step 706: Demodulate the plurality of transformed signals into a plurality of output signals.

Step 708: End.

Detailed operations and variations of the process 70 can be referred to the above illustration, and are not narrated herein.

It should be noted that realizations of the receiving device 50 (including the receiving unit 500, the transform unit 510, and the demodulation unit 520) and the receiving device 60 (including the S/P unit 602, the CP removal unit 604, and the FFT unit 606) are not limited to the above description. For example, two or more of the abovementioned units may be integrated into one or more units according to design considerations and/or system requirements. In addition, the receiving device 50 (or the receiving device 60) may be hardware (e.g., circuit), software, firmware (known as a combination of a hardware device and computer instructions and data that reside as read-only software on the hardware device), an electronic system, combination thereof, etc.

To sum up, the present invention provides a device and a method of handling a block transmission in a multicarrier system. The present invention guarantees orthogonality between signals on different sets of subcarriers in the same block transmission by using a modulation unit and a transformation unit. Thus, interference caused by the signals can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitting device, comprising:
   a modulation circuit, for modulating a plurality of input signals into a plurality of modulated signals;

a transform circuit, coupled to the modulation circuit, for transforming the plurality of modulated signals into a plurality of transformed signals according to a time-frequency transform; and a transmitting circuit, coupled to the transform circuit, for transmitting the plurality of transformed signals on a first subset of a plurality of subcarriers in a block transmission, and for transmitting a plurality of signals on a second subset of the plurality of subcarriers in the block transmission;

wherein the plurality of transformed signals and the plurality of signals conform to a first communication standard and a second communication standard, respectively, and the first communication standard and the second communication standard are different;

wherein the first subset of the plurality of subcarriers and the second subset of the plurality of subcarriers are not overlapped;

wherein the modulation circuit and the transmitting circuit operate according to different frequency division multiplexing (FDM) technologies.

2. The transmitting device of claim 1, wherein the time-frequency transform comprises a discrete Fourier transform (DFT).

3. The transmitting device of claim 1, wherein a subcarrier spacing of the plurality of transformed signals and a subcarrier spacing of the plurality of signals are different.

4. The transmitting device of claim 1, wherein the first subset of the plurality of subcarriers is between the second subset of the plurality of subcarriers and a third subset of the plurality of subcarriers.

5. The transmitting device of claim 1, wherein the transmitting circuit transmits the plurality of transformed signals according to an orthogonal frequency division multiplexing (OFDM) technology.

6. The transmitting device of claim 1, wherein the modulation circuit modulates the plurality of input signals according to a generalized frequency division multiplexing (GFDM) technology.

7. A receiving device, comprising:

a receiving circuit, for generating a plurality of received signals on a first subset of a plurality of subcarriers in a block transmission after receiving a plurality of radio signals, and for generating a plurality of signals on a second subset of the plurality of subcarriers in the block transmission;

a transform circuit, coupled to the receiving circuit, for transforming the plurality of received signals into a plurality of transformed signals according to a time-frequency transform; and a demodulation circuit, coupled to the transform circuit, for demodulating the plurality of transformed signals into a plurality of output signals;

wherein the plurality of received signals and the plurality of signals conform to a first communication standard and a second communication standard, respectively, and the first communication standard and the second communication standard are different;

wherein the first subset of the plurality of subcarriers and the second subset of the plurality of subcarriers are not overlapped;

wherein the receiving circuit and the demodulation circuit operate according to different frequency division multiplexing (FDM) technologies.

8. The receiving device of claim 7, wherein the time-frequency transform comprises an inverse discrete Fourier transform (IDFT).

9. The receiving device of claim 7, wherein a subcarrier spacing of the plurality of received signals and a subcarrier spacing of the plurality of signals are different.

10. The receiving device of claim 7, wherein the first subset of the plurality of subcarriers is between the second subset of the plurality of subcarriers and a third subset of the plurality of subcarriers.

11. The receiving device of claim 7, wherein the receiving circuit generates the plurality of received signals according to an orthogonal frequency division multiplexing (OFDM) technology.

12. The receiving device of claim 7, wherein the demodulation circuit demodulates the plurality of transformed signals according to a generalized frequency division multiplexing (GFDM) technology.

* * * * *